Feb. 18, 1936.                 L. M. PERSONS                 2,030,934
                              SPRAYING DEVICE
                           Filed Nov. 17, 1933           2 Sheets-Sheet 1
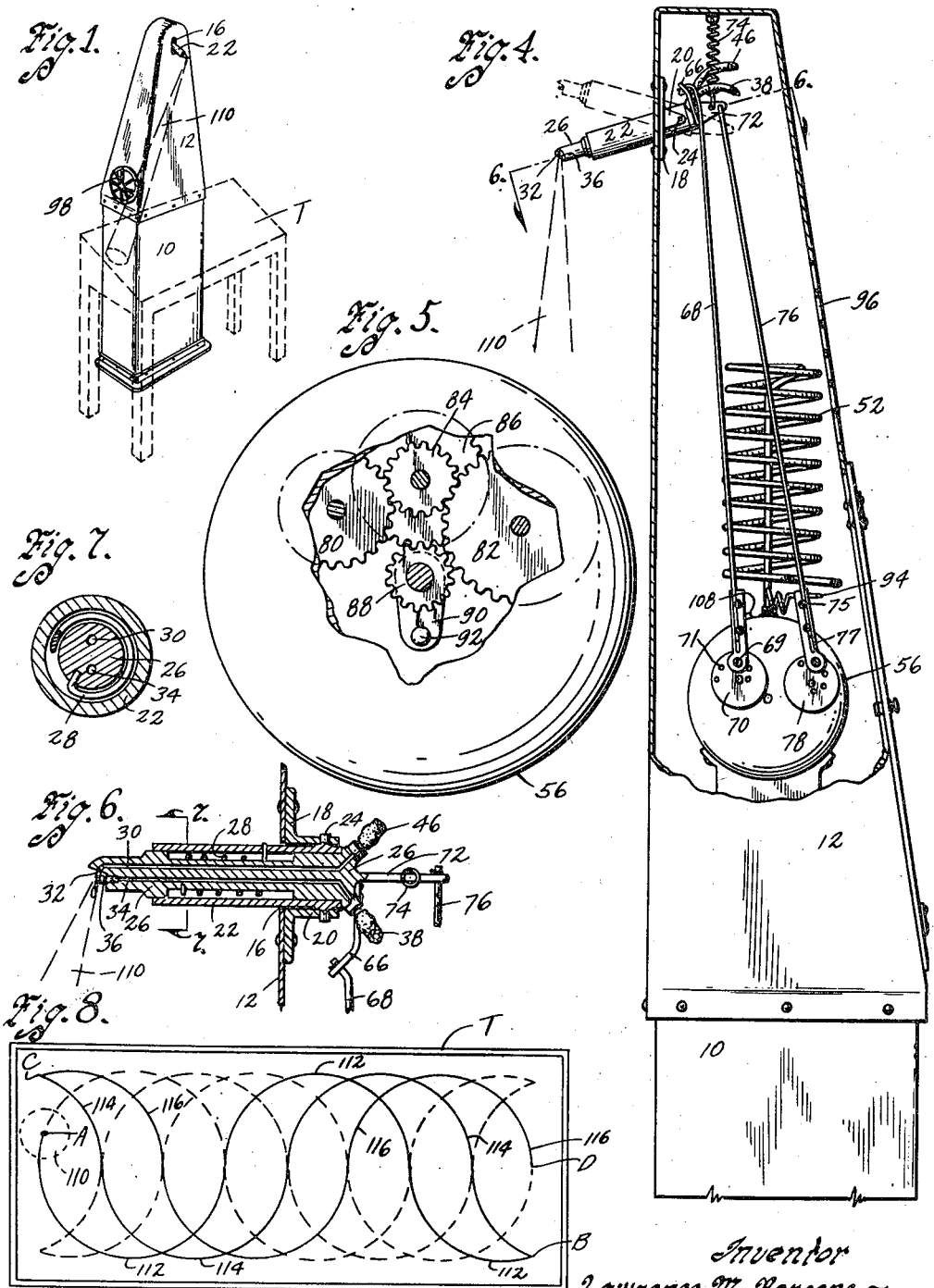
Witness
H. S. Wengenmair
Inventor
Lawrence M. Persons
By Bair, Freeman & Sinclair
Attorneys Feb. 18, 1936.　　　L. M. PERSONS　　　2,030,934
SPRAYING DEVICE
Filed Nov. 17, 1933　　2 Sheets-Sheet 2

Inventor
Lawrence M. Persons
By Bair, Freeman & Sinclair
Attorneys

Witness
H. S. Wengenmair

Patented Feb. 18, 1936

2,030,934

UNITED STATES PATENT OFFICE 2,030,934

SPRAYING DEVICE

Lawrence M. Persons, Des Moines, Iowa, assignor to Penn Electric Switch Co., Des Moines, Iowa, a corporation of Iowa Application November 17, 1933, Serial No. 698,479

4 Claims. (Cl. 299—62)

An object of my present invention is to provide a spraying device including a nozzle of simple, durable and inexpensive construction and simple mechanism for imparting to the nozzle such movement that a spray therefrom will cover a substantially rectangular area.

A further object is to provide a spraying device especially adapted for the spraying of vegetables or the like to keep them properly hydrated and fresh, the spray nozzle being operable by compressed air at but slight pressure and by the continuous supply of a small quantity of water under pressure to the nozzle.

Still a further object is to provide a nozzle mounted on two pivots at substantially right angles to each other to impart to the nozzle by oscillating it on each pivot a movement which will cause the spray issuing therefrom to zigzag across a vegetable tray or the like and substantially cover the entire area thereof even though the tray is rectangular in shape and the spray is cone-shaped and strikes a circular area.

A further object is to provide an air pump especially adapted for spraying water on vegetables and which is lubricated, yet is provided with novel mechanism which positively prevents any of the oil from being conducted to the spray nozzle with the compressed air.

A further object is to provide mechanism for oscillating the nozzle on its two pivots, the mechanism being arranged so that it is not in synchronism and consequently causes a retracing of the path of the spray across the vegetable tray only after a number of cycles of oscillation have occurred.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of my spraying device showing mounted beside it in dotted lines a vegetable tray.

Figure 4 is a sectional view on the line 4—4 of Figure 2.

Figure 5 is an enlarged view of the pump shown in Figure 4 with part of the casing broken away to show internal gearing.

Figure 6 is an enlarged longitudinal sectional view through the spray nozzle itself, as taken on the line 6—6 of Figure 4.

Figure 7 is a sectional view on the line 7—7 of Figure 6; and

Figure 8 is a diagrammatic view showing the path of travel of the spray with relation to a rectangular vegetable tray.

Figure 3:
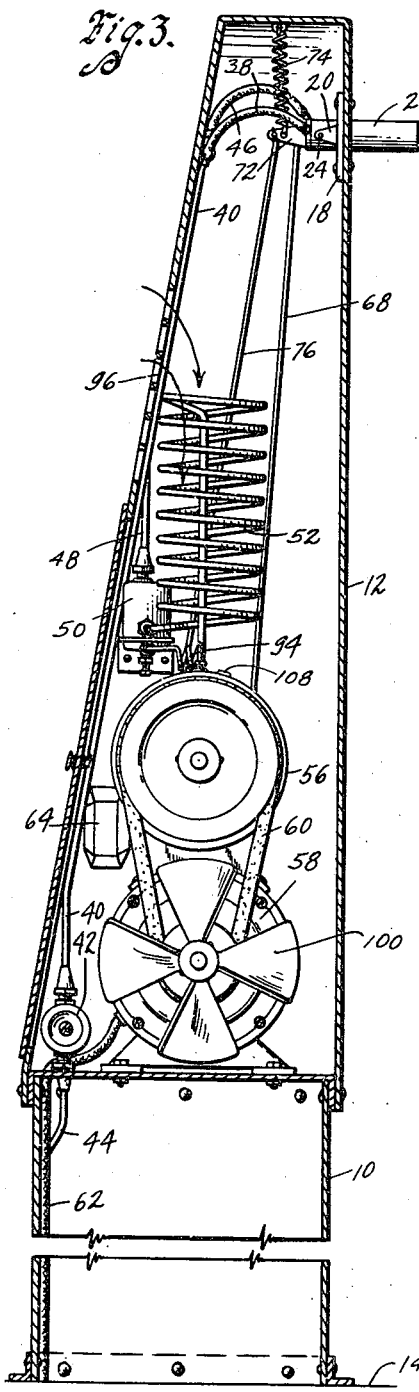
Figure 3 is a sectional view on the line 3—3 of Figure 2.

On the accompanying drawings, I have used the reference numeral 10 to indicate an upright tubular base casing. This may be made of sheet metal or the like and is provided for supporting a main casing 12 in a position substantially spaced above a floor surface 14 or the like. The main casing 12 contains the various apparatus of my invention.

Figure 2:
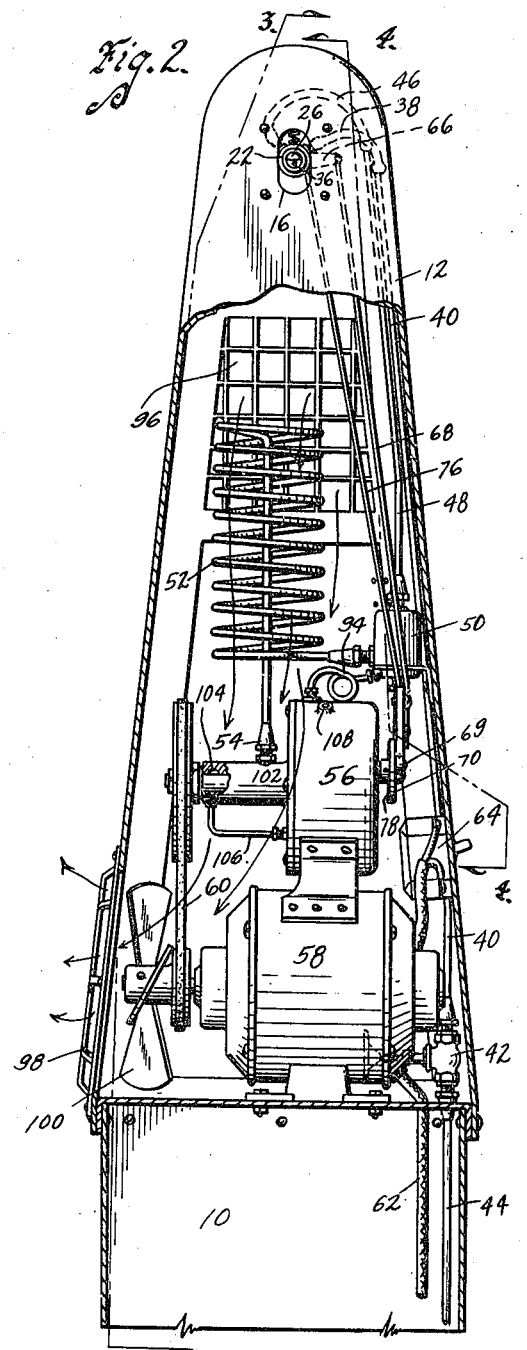
Figure 2 is a front elevation of the same on an enlarged scale, part of the casing being broken away and shown in section in order to show the interior details of construction.

The front of the casing 12, as shown in Figure 2, is provided with a vertically elongated opening 16. A plate 18 is secured to the casing 12 surrounding the opening 16 and has a similar opening registering therewith. The plate 18 also is provided with a pair of perforated ears 20. A spray nozzle barrel 22 extends through the opening 16 and is provided with a pair of pintles 24 journalled in the perforations of the ears 20. It will thus be obvious that the spray nozzle barrel can be oscillated in a vertical plane.

Within the spray nozzle barrel 22, I provide a spray nozzle 26, it being rotatably mounted with respect to the barrel and constrained to oscillate in one direction by a spring 28. The spring 28 is mounted within the barrel and surrounds the spray nozzle as clearly shown in Figures 6 and 7.

The spray nozzle itself has a compressed air passageway 30 terminating in an orifice 32. The nozzle also has a water passageway 34 terminating in a tube 36, the outer end of which is located in the air stream from the orifice 32.

For supplying water to the passageway 34, I provide a flexible tube 38, such as one made of rubber, and connected with a water pipe 40 which may be a copper tube. The water pipe 40 extends to a needle control valve 42 to which water is supplied by a water supply pipe 44.

For supplying compressed air to the passageway 30, I provide a flexible tube 46 connected with a copper tube or the like 48. The tube 48 connects with an oil filter 50 which in turn is connected with a cooling and condensing tube-like coil 52. The coil 52 connects with the outlet 54 of an air compressor 56. The air compressor is not illustrated in detail as it forms no part of the present invention and is the subject matter of my copending application for patent, Serial No. 692,805, filed October 9, 1933.

For operating the air compressor 56, I provide an electric motor 58 connected therewith by a belt 60. A current supply cable 62 extends to the motor 58 and the current flow therethrough is controlled by a snap switch 64.

For oscillating the nozzle 26 within the nozzle barrel 22, I provide an arm 66 extending from the nozzle and connected by a link 68 with a crank disk 70. For oscillating the nozzle barrel and the nozzle about the pintles 24, I provide an arm 72 normally held in raised position by a spring 74 and pulled in a downward direction by a link 76. The link 76 extends to a crank disk 78.

The crank disks 70 and 78 are driven from the air compressor 56 by means of gears 80 and 82, respectively, meshing with a pinion 84. The pinion 84 rotates integrally with a gear 86, which in turn is driven by a pinion 88. The pinion 88 is provided with a crank arm 90 coacting with the crank pin 92 of the air compressor 56, the shaft of which is in alinement with the shaft for the pinion 88. Thus operation of the electric motor 58 drives the air compressor and also the crank disks 70 and 78.

The coil of tubing 52 serves the double purpose of cooling the air after it is compressed so that heated air is not discharged from the spray nozzle 26 onto the vegetables and condensing any oil that is pumped from the air compressor 56 so that it will change from a vapor, which would be discharged from the orifice 32, to an oil which gravitates down the inclined tube 52 to the oil filter 50.

From the oil filter, the air under pressure therein forces the oil through a very small bore tube 94 to the casing of the air compressor 56 which is an intake chamber for the air compressor. There, of course, is a slight vacuum in this chamber which also tends to draw in the condensed oil and thus all danger of vaporized oil being discharged from the spray nozzle is eliminated. To facilitate the cooling and condensing operation in the coil 52, the casing 12 is provided with an air inlet grating 96 and an air outlet grating 98. Air is circulated from one to the other, as indicated by the arrows in Figure 2, by a fan 100 mounted on the shaft of the motor 58.

Since there is a vacuum within the pump casing 56, I also provide for the prevention of any oil getting out of a pulley bearing 102 of the air compressor 56 by providing in the bearing an annular groove 104 to collect oil working outwardly along the compressor shaft. This oil collects in the groove and is conducted by a small bore tube 106 back to the intake chamber of the air compressor 56. Air from atmosphere may be admitted through a boss 108 or the like.

It will be noted in Figure 5 that the gears 80 and 82 are of different sizes. This is to cause the spray indicated at 110, issuing from the spray nozzle 26 from retracking over the same path each oscillation of the spray nozzle.

For instance, the oscillation on the pivot 24 may be oftener or not so often as the oscillation of the nozzle 26 within the barrel 22. This can be determined by the relative diameters of the gears 80 and 82. In Figure 8, I have illustrated one way in which the spray 110 may travel. Considering A as the starting point, the spray travels over a solid line 112 to the point B by reason of the dual oscillation. The oscillation is reversed at B by the link 68 so that a line 114 is traced.

Reversal again occurs at C and a line 116 is traced until the point D is reached. The tracings shown by dotted lines are then made and finally end at the point A which completes one cycle of the dual oscillation. It will be noted that the various solid lines 112, 114 and 116 and the dotted lines cross each other but do not trace each other, retracing occurring only after the starting point A is again reached. The size of the spray 110 is indicated by a dotted line and it will therefore be obvious that substantially the entire area of the vegetable tray T is covered by the spray during one cycle of oscillations.

To accommodate a longer tray T, the throw of the link 68 may be adjusted. It will be noted that the crank disk 70 has a plurality of openings 71 different distances from the center for this purpose.

A crank pin 69 can be placed in the proper opening to secure the degree of oscillation of the nozzle 26 within the barrel 22 for any desired length of tray T. Likewise, the throw of the link 76 with respect to the crank disk 78 can be adjusted for changing the degree of oscillation of the nozzle on the pivot 24, thus accommodating a wider or narrower tray T. The links 68 and 76 are also longitudinally adjustable by means of clamp screws 75 clamping them in grooves of crank pin arms 77 so as to adjust the spray more toward the right or the left of the spraying device, or closer or farther from its front surface.

The connections of the links 68 and 76 with the arms 66 and 72 are by means of perforations slightly larger than the diameters of the links 68 and 76 and the ends of the links are curved sufficiently to prevent one connection from preventing the other arm from oscillating freely under the action of its link.

A cone-shaped spray takes considerably less water and less volume and pressure of compressed air, yet it is desirable to completely spray the area of a rectangular vegetable tray as most trays are made in this shape. My particular arrangement for the double oscillation of the spray nozzle provides for directing a cone-shaped spray over the entire surface of a rectangular tray without the necessity of having to provide a fan-shaped spray for instance, which takes greater air pressure and volume. A continuous spray on the vegetables is objectionable because they would become hydrated to too great a degree. Therefore, by passing the spray over any one point on the tray but once in a given period of time as determined by the length of time it takes for a cycle of oscillations to be completed, overhydration is prevented, yet the spray itself can operate continuously.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a spraying device, a supporting post, a spray nozzle, means for mounting said spray nozzle so that its discharge end extends laterally from the upper end of said post, said mounting means including a pair of pivots within said post and at right angles to each other and means for oscillating said spray nozzle about each pivot to thereby cause a spray from said spray nozzle to traverse a path which is zigzag in one direction and back and forth at right angles to said direction during the operation of the spraying device.

2. In a spraying device, a casing, a horizontal pivot pin supported thereby, a spray nozzle barrel pivoted thereon, a spray nozzle oscillatably mounted in and extending parallel to said barrel, the nozzle opening on the outer end thereof being directed laterally relative to said barrel, means for oscillating said barrel about said pivot pin and means for oscillating said spray nozzle within said barrel.

3. In a spraying device, a casing, a horizontal pivot pin supported thereby, a spray nozzle barrel pivoted thereon, a spray nozzle oscillatably mounted in and extending parallel to said barrel, the nozzle opening on the outer end thereof being directed laterally relative to said barrel, means for oscillating said barrel about said pivot pin and means for oscillating said spray nozzle within said barrel, said first means oscillating said barrel about said pivot pin at a different speed than the second means oscillates said spray nozzle within said barrel.

4. In a spraying device, a post-like support for positioning beside a table or the like to be sprayed, a horizontal pivot within said support, a barrel pivoted thereto, a spray nozzle oscillatable in said barrel and having a discharge orifice arranged at an angle to the axis thereof and positioned outside of said barrel, said support having an opening therein for said barrel to project through whereby said discharge orifice is exterior of said support, means within said support for compressing air and discharging it from said orifice, a water supply nipple having its discharge end located in the path of air discharged from said orifice, means for operating said air compressor and oscillating means driven by said last means for oscillating said barrel about its horizontal pivot and for oscillating said nozzle within said barrel, the oscillation of one relative to the other being fractional whereby the spray from said nozzle retraces its path only after a number of oscillating cycles of the barrel and nozzle have been completed.

LAWRENCE M. PERSONS.